United States Patent [19]
Giordano et al.

[11] Patent Number: 6,118,772
[45] Date of Patent: Sep. 12, 2000

[54] WIRELINE TELEPHONY ON A CELLULAR SWITCH

[75] Inventors: Glenn A. Giordano, Allen; Martin P. J. Cornes; Christopher J. Koath, both of Plano; Robert E. Montgomery, Carrollton; Richard L. Howe, Jr., Plano; Rudolph Benedict Klecka, III, Dallas, all of Tex.

[73] Assignee: Alcatel USA Sourcing L.P., Plano, Tex.

[21] Appl. No.: 09/016,047

[22] Filed: Jan. 30, 1998
(Under 37 CFR 1.47)

[51] Int. Cl.[7] .............................. H04Q 7/00; H04L 12/50; H04L 11/00
[52] U.S. Cl. ............................................ 370/328; 370/376
[58] Field of Search ...................... 370/327, 328, 370/340, 369, 375, 376, 352–4; 455/461, 462, 466, 517, 555, 560, 561

[56] References Cited

U.S. PATENT DOCUMENTS

| | | |
|---|---|---|
| 4,402,074 | 8/1983 | Cupius et al. . |
| 5,088,089 | 2/1992 | Gingell et al. . |
| 5,105,421 | 4/1992 | Gingell . |
| 5,109,409 | 4/1992 | Bomgardner et al. . |
| 5,305,308 | 4/1994 | English et al. .......................... 370/32.1 |
| 5,459,761 | 10/1995 | Monica et al. . |
| 5,479,608 | 12/1995 | Richardson . |
| 5,493,328 | 2/1996 | Kroninger et al. . |
| 5,497,373 | 3/1996 | Hulen et al. .............................. 370/79 |
| 5,740,157 | 4/1998 | Demiray et al. . |
| 5,805,997 | 9/1998 | Farris ...................................... 455/461 |
| 5,822,420 | 10/1998 | Bolon et al. . |
| 5,884,148 | 3/1999 | Bilgic et al. . |
| 5,978,672 | 11/1999 | Hartmaier et al. ....................... 455/413 |
| 5,991,639 | 11/1999 | Rautiola et al. ......................... 455/553 |

FOREIGN PATENT DOCUMENTS 0 509 548  10/1992  European Pat. Off. .
97/24004  7/1997  WIPO .

*Primary Examiner*—Douglas W. Olms
*Assistant Examiner*—David R Vincent
*Attorney, Agent, or Firm*—Fish & Richardson P.C.

[57] ABSTRACT

A telecommunications terminal is provided that is compatible with, and capable of connecting to, a cellular switch. Also provided are a protocol engine programmed to convert signals used in the terminal to a protocol required by the cellular switch and a service element programmed to generate wireline services for wireline subscribers.

17 Claims, 5 Drawing Sheets

Figure 1: Prior Art

WIRELINE TELEPHONY ON A CELLULAR SWITCH

BACKGROUND

The invention is related to access terminals for telecommunications systems.

Telecommunications terminals connect subscriber lines, such as POTS (Plain Old Telephone Service) and ISDN (Integrated Services Digital Network) lines, to telecommunications equipment such as a telecommunications switch, e.g., a class 5 switch. Telecommunications switches connect and route messages between different lines.

A telecommunications terminal contains channel unit card slots that accept channel unit cards. Channel unit cards convert analog and digital signals from subscriber lines into formatted digital data signals. Different types of channel unit cards service different types of subscriber lines (e.g. POTS or ISDN). The terminal constructs one or more time division multiplexed (TDM) signals from several channel unit cards' formatted digital data signals for transmission to remote telecommunications equipment for example, another telecommunications terminal. The terminal also demultiplexes TDM signals received from remote telecommunications equipment to deliver formatted digital data back to the channel unit cards. Channel unit cards convert the formatted digital data into a form suitable for transmission over subscriber lines.

Two telecommunications terminals can be connected "back-to-back" to form a digital loop carrier (DLC) network. A DLC typically includes a remote terminal (RT) placed near a business or residence and a central terminal (CT) placed in a central exchange connected to a telecommunications switch. The RT and CT communicate over a single or multiple lines carrying TDM signals. This configuration connects subscribers to the telecommunications switch via the DLC. A digital loop carrier (DLC) at a central terminal (CT) includes a multiplexor which, using TDM, can multiplex multiple analog and digital signals from subscriber telephone lines into a single or multiple, T1 or E1 signals. A mirror DLC located at a remote terminal (RT) can decode the multiplexed T1 signal into a form suitable for transmission over subscriber telephone lines. This data flow also occurs in the opposite direction from RT to CT.

SUMMARY

A telecommunications terminal, capable of connecting to a cellular switch, includes a protocol engine programmed to convert signals used in the terminal to a protocol required by the cellular switch. A service element in the terminal is programmed to produce wireline services to wireline subscribers.

In accordance with one or more embodiments, the service element is a digital signal processor. The protocol engine may reside either within a digital signal processor or on a control processor in the terminal. A time slot interchanger is provided for routing pulse code modulated signals.

A method of connecting a telecommunication terminal to a cellular switch includes converting signals used in the terminal to a protocol required by the cellular switch and providing wireline services.

In accordance with one or more embodiments, provision of wireline services is performed by a digital signal processor. The protocol conversion is accomplished by the digital signal processor, the control processor or both. Provision of wireline services is performed by a control processor residing in the terminal. The method may include routing pulse code modulated signals.

Advantages may include one or more of the following. Cellular service providers will be able to provide local wireline service without replacing existing hardware. The time and cost of expanding local wireline service into areas covered only by cellular switch will be substantially reduced. Cellular service providers will be able to compete with local wireline service provider without restructuring existing equipment. Local wireline customers added to a cellular switch do not require any of the switch's cellular radio spectrum. Other advantages and features will become apparent from the following description including the drawings and claims.

DETAILED DESCRIPTION

Figure 1:
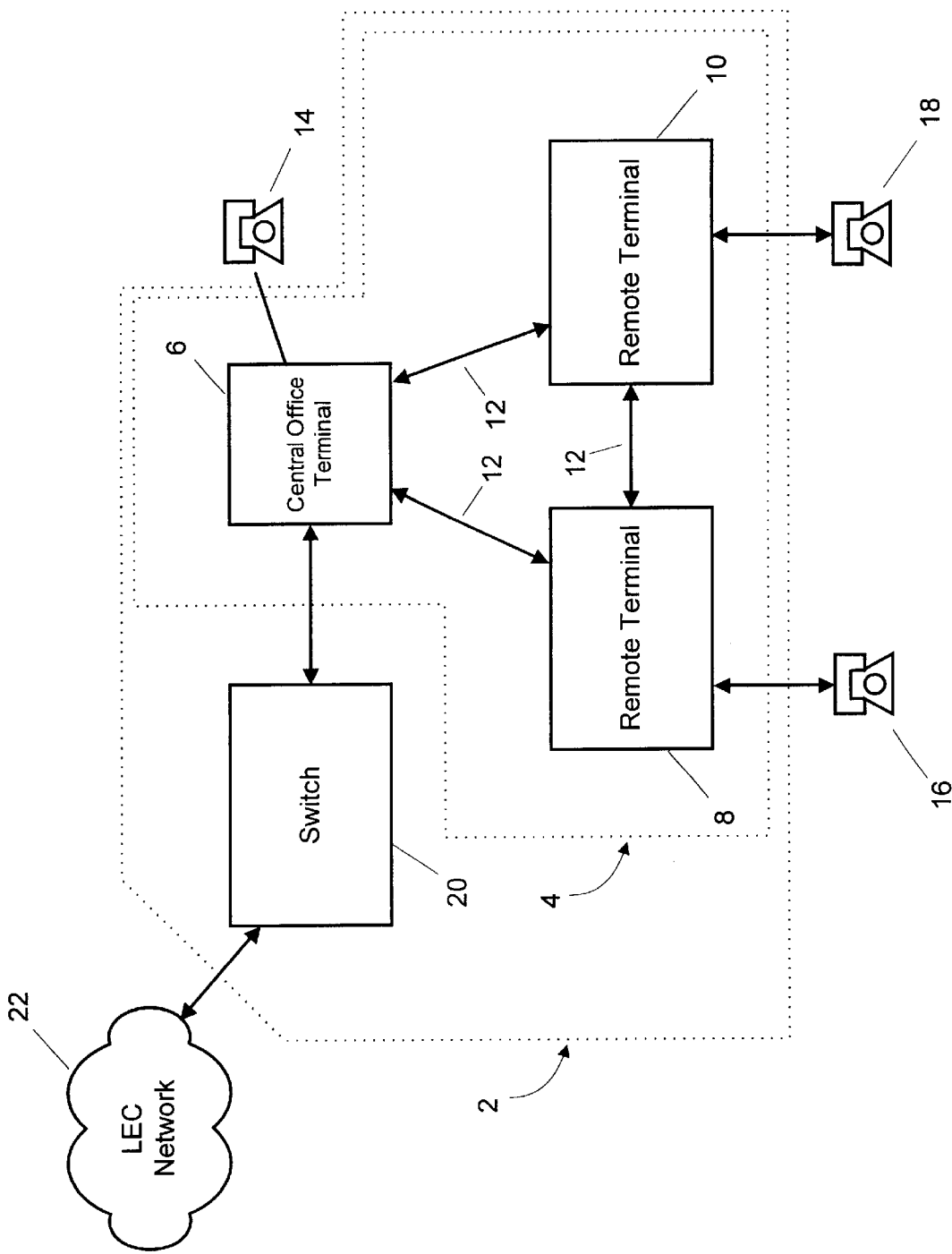
FIG. 1 is a diagram of a telecommunication system.

As shown in FIG. 1, a telecommunications system 2 includes a digital loop carrier (DLC) 4. The digital loop carrier 4 includes a central office terminal (CT) 6 coupled to one or more remote terminals (RT) 8, 10 via metallic, fiber or other suitable communication media 12. DLC 4 performs call control and management signals and provides central office call processing functions. Subscriber devices, such as telephone service equipment 14, 16, 18, may be coupled to the central office terminal 6 and to the remote terminals 8, 10, respectively. The central office terminal 6 also is coupled to a local exchange carrier (LEC) network 22. The central office terminal 6 may be coupled to the LEC network 22 through a switch 20, such as a class 5 or tandem switch.

Figure 2:
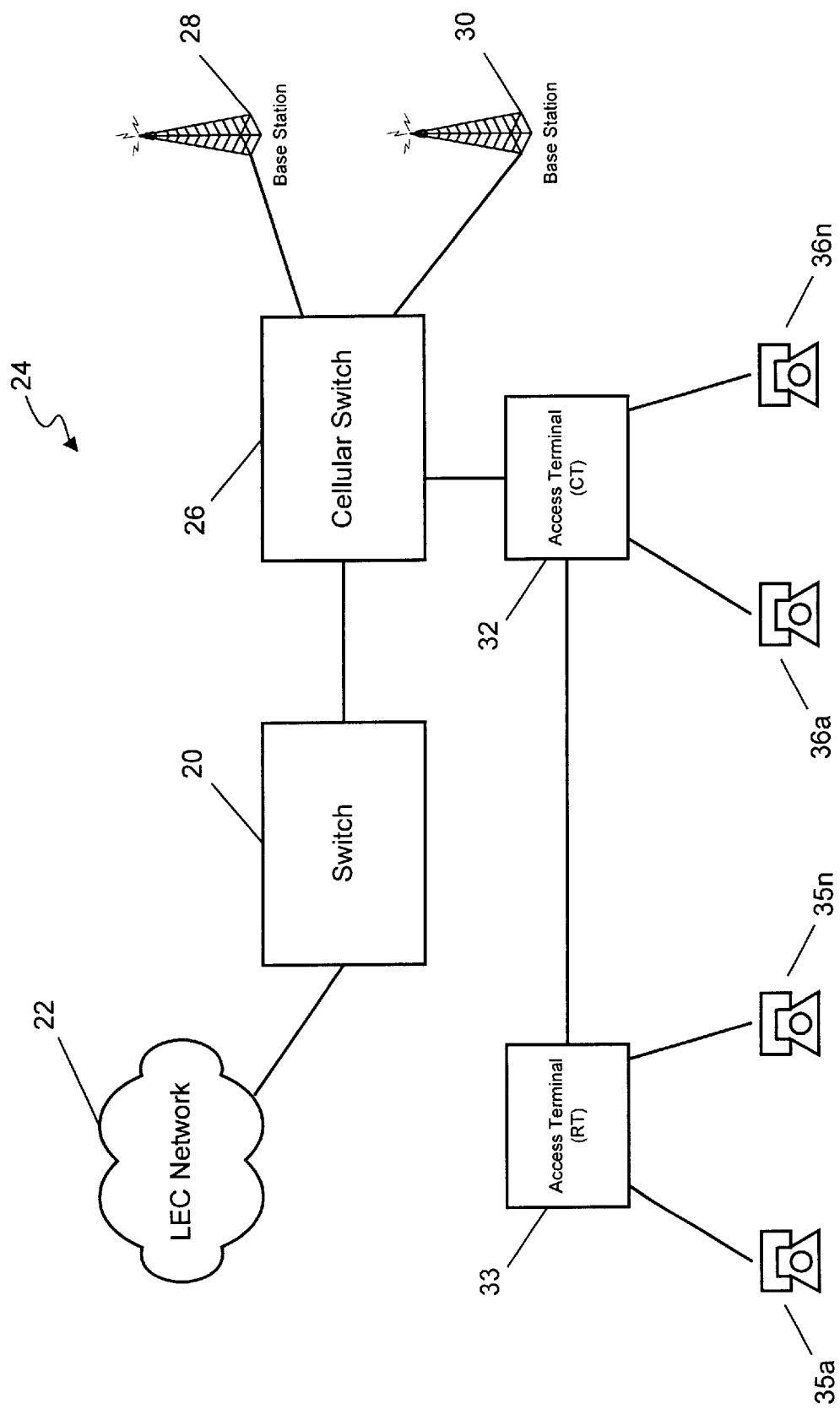
FIG. 2 is a diagram of a cellular system.

Similarly, as shown in FIG. 2, a cellular telecommunication system 24 includes a cellular-switch 26 coupled to one or more remote base stations 28, 30. As with the DLC network shown in FIG. 1, cellular switch 26 also can be coupled to the LEC network 22 and this coupling may be through a switch 20, such as a class 5 or tandem switch. Cellular switch 26 differs from a DLC in several respects because, among other reasons, cellular phone service protocols differ from wireline service protocols. For example, cellular subscribers are not prompted with a dial tone prior to dialing a destination number. Rather, cellular subscribers must first dial a number, and then cause the number to be transmitted to the base station by pressing a "SEND" button or the like. In contrast, a wireline subscriber receives a dial tone prior to dialing the desired number.

An access terminal 32, e.g., a Litespan-120 digital loop carrier (DLC) made by DSC Communications Corporation, can be modified to connect wireline users to cellular switch 26. This allows cellular service providers to offer local wireless service without the trouble and expense of replacing existing equipment. This modification can be accomplished by adding a protocol engine and a service element. Remote access terminals, e.g., terminal 33, are able to be coupled to central access terminal 32.

Figure 3:
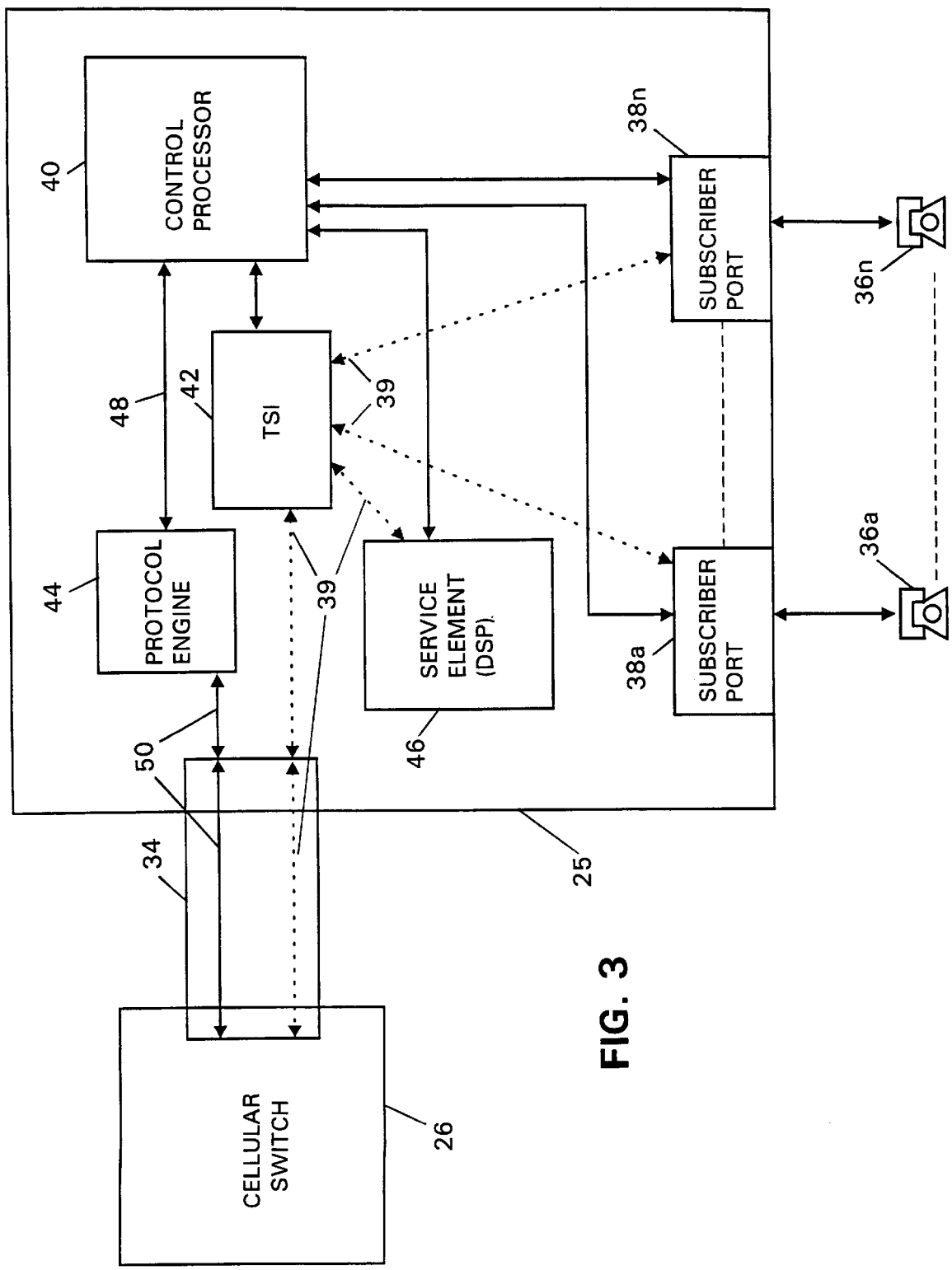
FIG. 3 is a block diagram of components of a cellular system.

A block diagram of components of a DLC 25 configured to communicate with a cellular switch is shown in FIG. 3.

DLC 25 is connected to a cellular switch 26 by a physical transport 34, such as T1 lines, E1 lines, optics, etc. Subscribers 36*a–n* are connected to the DLC 25 through subscriber ports 38*a–n*. Each subscriber port may be adapted to accept a different type of transmission medium, i.e., POTS, ISDN, etc. Each subscriber port 38*a–n* is connected to a control processor 40 for purposes of generic call control. A time slot interchanger (TSI) 42 handles pulse code modulated (PCM) data routing 39 and receives control messages from control processor 40. Control processor 40 also sends generic call control protocol to protocol engine 44.

Protocol engine 44 is a software entity that enables DLC 25 to emulate the functionality of a cellular base station 28, 30. The protocol engine 44 may be implemented on control processor 40 or service element 46 or may be an individual component as shown. Protocol engine 44 is configured to convert call processing communications, messages or signals from other components in DLC 25 to the particular protocol required by the cellular switch 26, e.g., IS-651 or other proprietary protocols.

An important aspect of cellular protocol emulation involves providing information relating to topics such as cellular security, base station handoff, quality of service, etc. The access terminal 32 can provide this information in a consistent manner. For example, DLC 25 will send the proper protocol to cellular switch 26 to cause a wireline user 36*a–n* to appear as a non-moving (i.e., remaining in the same cell) cellular user with clear transmission and proper security identification.

Similarly, protocol engine 44 can be configured to convert protocol-specific call processing messages or signals received from the cellular switch 26 to the generic message-oriented signaling recognized and used by DLC 25. Call processing methods are disclosed in U.S. patent application [attorney docket 08242.008001], entitled "Routing Call Processing in a Telecommunications System", filed Dec. 23, 1997. The disclosure of that application is incorporated herein by reference.

In general, DLC 25 uses the protocol engine 44 to convert generic message-oriented signals representing subscriber line activities 48 to signals formatted according to a specific protocol 50 recognized by cellular switch 26. The protocol-specific signals then can be routed to the LEC network 22 as though they were representative of cellular activities. Similarly, protocol engine 44 can convert call processing signals representing LEC network line activities to a message-oriented signaling format that is independent of the cellular switch protocol prior to delivering the activity information to other components in the system.

Service element 46 of the modified access terminal generates and manages wireline services. The service element includes a digital signal processor (DSP), memory and an application specific integrated circuit (ASIC) that provides call resources. Service element 46 may provide dial tone generation, digit and dial plan collection, access to class services, such as conference calling, redial, call line identification, etc., and other digital signal processor services. Wireline services typically are associated with wireline switches and are not ordinarily available in a cellular system 24.

By adding a protocol engine 44 and a service element 46, DLC 25 is able to support wireline subscribers 36*a–n* and appears to a cellular switch 26 to be a cellular base station 28, 30. As a result, such a modified access terminal 32 can be added to an existing cellular network 24 in substantially the same manner as a cellular base station 28, 30 is added.

Figure 4:
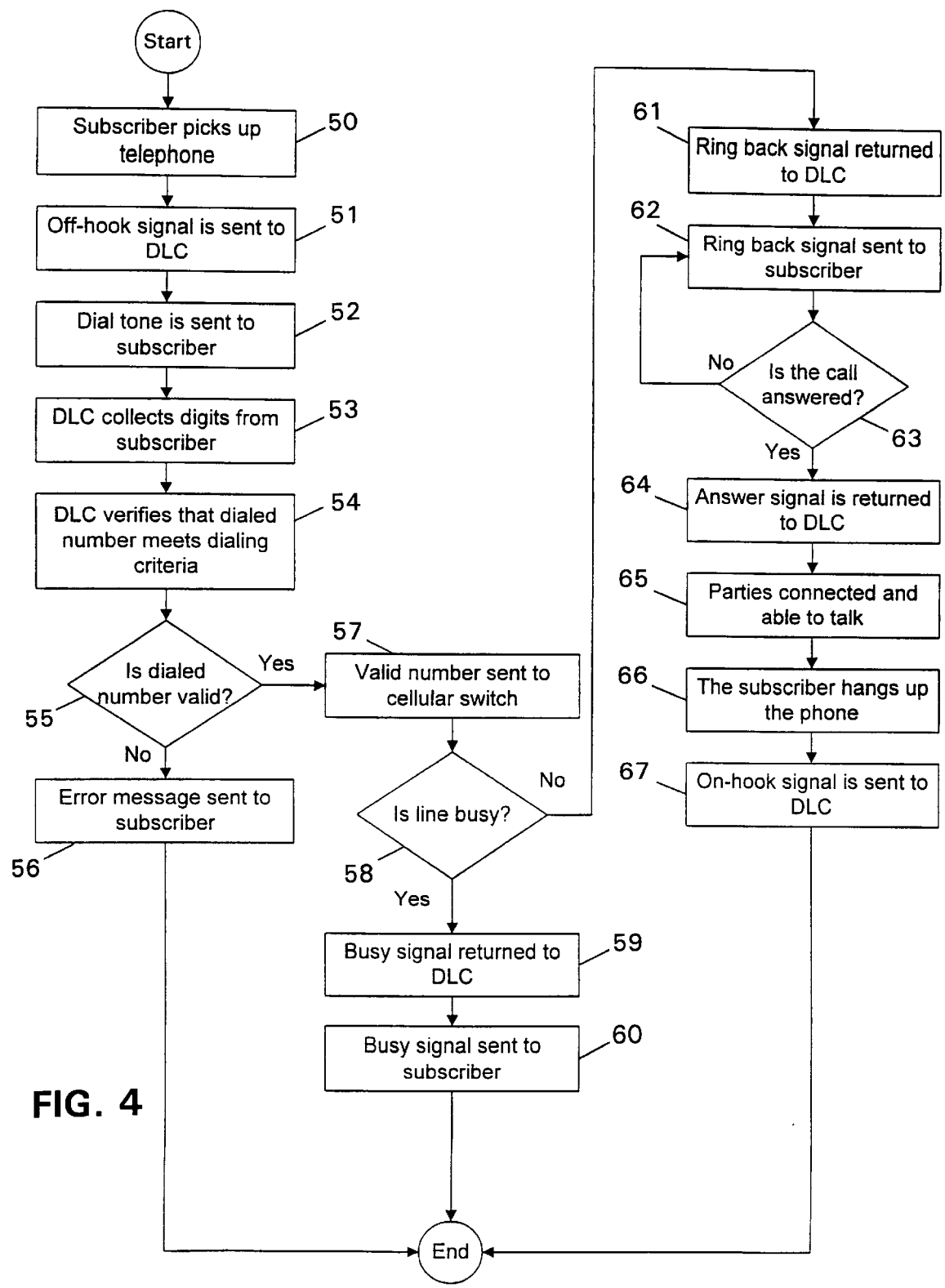
FIG. 4 is a flow chart of a cellular system when a subscriber initiates a call.

FIG. 4 is a diagram showing the call processing path for a call originated at the subscriber side of a telecommunications connection. When a subscriber picks up a telephone (step 50), an off-hook signal is sent to the DLC (step 51). Service element 46 of the access terminal 32 produces a dial tone for the subscriber in response (step 52). The subscriber then dials a desired number and the digits are collected by the DLC (step 53). Once collected, the DLC compares the dialed number to a preprogrammed dialing criteria to determine whether the dialed number is valid (step 54). This preprogrammed dialing criteria is part of the provisioning information supplied by a user. If the dialed number is not a valid number a error message is sent to the subscriber (step 56). If the dialed number is valid, message exchange between the DLC and the cellular switch begins. Valid dialed numbers are sent to the cellular switch (step 57) and destination availability is checked (step 58). If the line the call is being placed is busy (step 59), the DLC returns a busy signal to the subscriber (step 60). If, however, the line is available (step 61), the DLC will send a ring back signal to the subscriber (step 62). If the call is answered (step 63), an answer signal is returned to the DLC (step 64). Upon receiving an answer signal the DLC will connect the subscriber to the line which allows the two parties (caller and callee) to talk (step 65). Once either party hangs up, the connection will be terminated. If the caller hangs up (step 66), an on-hook signal will be sent to the DLC (step 67). If the callee hangs up, a call termination signal comes into the DLC from the cellular switch and a disconnect signal will be sent to the caller. For illustration purposes, the call is terminated by the subscriber in this example.

Figure 5:
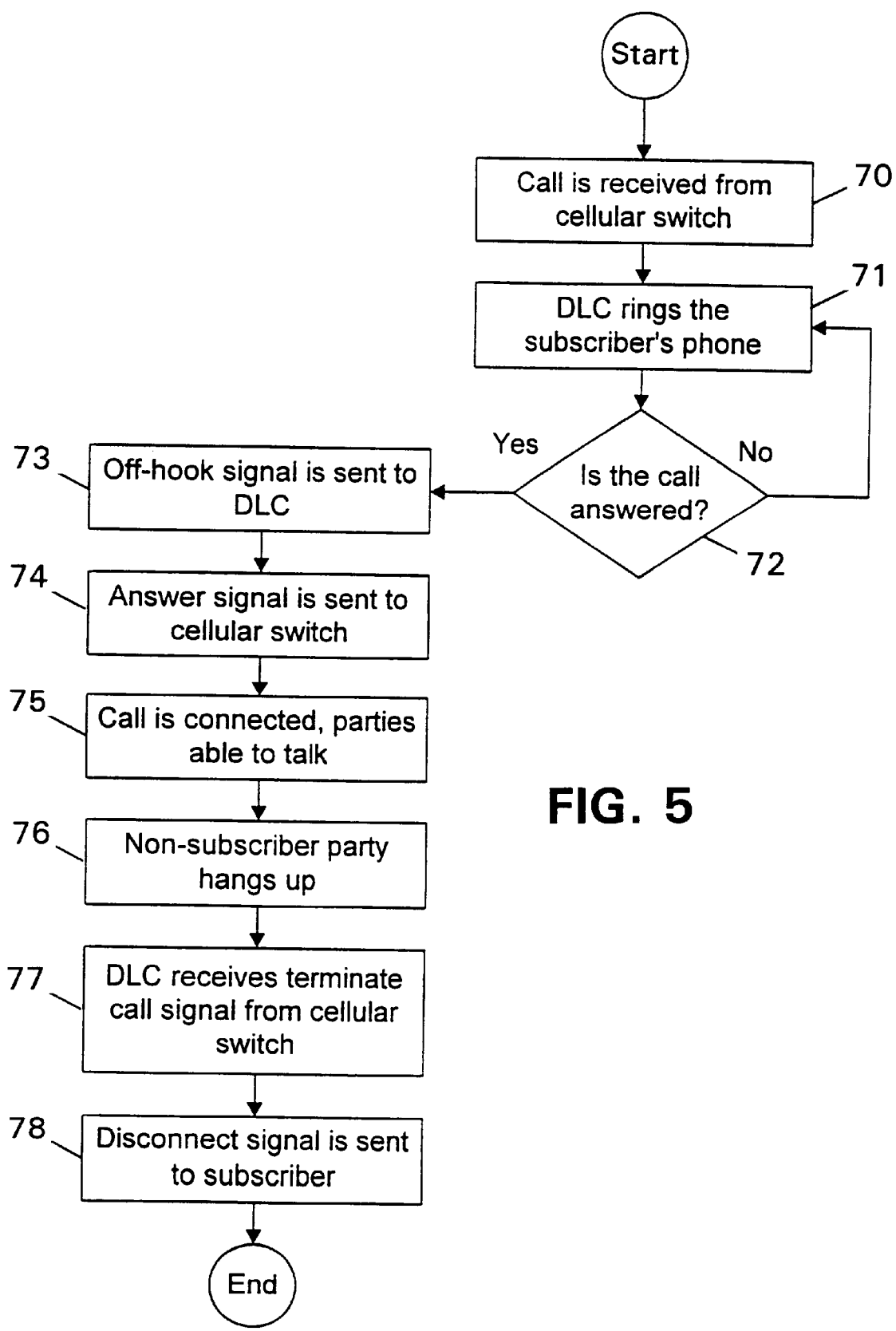
FIG. 5 is a flow chart of a cellular system when a call to a subscriber is initiated.

FIG. 5 is a diagram showing the call processing path for a call originated at the network side of the connection. In this case, a call comes into the DLC from the cellular switch (step 70). The DLC rings the phone of the subscriber being called (step 71). If the subscriber answers (step 72), an answer signal is returned to the cellular switch (step 73), the lines are connected and the two parties are able to talk (step 74). As with the previous illustration, once either party hangs up the call is terminated (step 78). For illustration purposes, the call is terminated by the non-subscriber in this figure (step 77).

Other implementations are within the scope of the following claims.

What is claimed is:

1. A digital loop carrier compatible with a cellular switch, the digital loop carrier comprising:

a protocol engine programmed to convert signals used in the digital loop carrier to a protocol used by the cellular switch enabling the digital loop carrier to emulate a cellular switch; and a service element programmed to provide wireline services wherein the digital loop carrier appears as a base station to the cellular switch.

2. The digital loop carrier of claim 1, wherein the service element comprises a digital signal processor, memory and an application specific integrated circuit.

3. The digital loop carrier of claim 2, wherein the protocol engine resides within the digital signal processor.

4. The digital loop carrier of claim 1, wherein the protocol engine resides on a control processor in the digital loop carrier.

5. The digital loop carrier of claim 2, wherein the protocol engine resides on both a control processor in the digital loop carrier and a digital signal processor in the digital loop carrier.

6. The digital loop carrier of claim 1, further comprising:

a time slot interchanger for routing pulse code modulated signals.

7. A method of connecting a telecommunication terminal to a cellular switch comprising:

converting signals in the digital loop carrier to a protocol required by the cellular switch enabling the digital loop carrier to emulate a cellular switch; and providing wireline services in the digital loop carrier.

8. The method of claim 7, wherein the provision of wireline services is performed by a digital signal processor.

9. The method of claim 8, wherein the protocol conversion is performed by the digital signal processor.

10. The method of claim 7, wherein the provision of wireline services is performed by a control processor residing in the terminal.

11. The method of claim 7, wherein the protocol conversion is performed by both a control processor and a digital signal processor.

12. The method of claim 7, further comprising:

routing pulse code modulated signals.

13. A digital loop carrier compatible with a cellular switch, the digital loop carrier comprising:

means for converting signals used in the terminal to a protocol required by the cellular switch enabling the digital loop carrier to emulate a cellular switch; and means for providing wireline services wherein the digital loop carrier appears as a base station to the cellular switch.

14. A digital loop carrier compatible with a cellular switch, the digital loop carrier comprising:

a protocol engine residing on a control processor programmed to convert signals used in the digital loop carrier to a protocol used by the cellular switch enabling the digital loop carrier to emulate a cellular switch;

a service element programmed to provide wireline services comprising a digital signal processor;

a memory; and an application specific integrated circuit;

a time slot interchanger for routing pulse code modulated signals; and subscriber ports each constructed to accept a different type of transmission medium to communicate with remote telecommunications equipment.

15. The digital loop carrier of claim 1, wherein the protocol engine converts message-oriented signals formatted according to a predetermined protocol recognized by a cellular switch and converts call processing signals representing LEC network line activities to a message-oriented signaling format that is independent of the cellular switch protocol prior.

16. The digital loop carrier of claim 1, wherein the protocol engine is configured to send a protocol to the cellular switch causing a wireline user connected to the terminal to appear as a non-moving cellular user with clear transmission.

17. The digital loop carrier of claim 1, wherein the protocol engine is configured to send a protocol to the cellular switch causing a wireline user connected to the terminal to appear as a non-moving cellular user with proper security identification.

* * * * *